US006946642B2

(12) United States Patent
Mangoubi

(10) Patent No.: US 6,946,642 B2
(45) Date of Patent: Sep. 20, 2005

(54) OPTICAL WINDOW ASSEMBLY FOR USE IN A SUPERSONIC PLATFORM

(75) Inventor: Sami Mangoubi, Haifa (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 0 days.

(21) Appl. No.: 10/736,508

(22) Filed: Dec. 17, 2003

(65) Prior Publication Data

US 2004/0129866 A1 Jul. 8, 2004

Related U.S. Application Data

(62) Division of application No. 09/972,246, filed on Oct. 9, 2001.

(30) Foreign Application Priority Data

Oct. 26, 2000 (IL) ........................................ 139304

(51) Int. Cl.[7] ........................................ H01I 1/70
(52) U.S. Cl. ........................................ 250/216; 244/3.06
(58) Field of Search ........................................ 250/216, 221, 250/222.1, 222.2, 203.1, 203.6; 428/426; 359/845; 244/3.16–3.17, 129.3, 117 A

(56) References Cited

U.S. PATENT DOCUMENTS 4,797,683 A 1/1989 Kosowsky et al.
5,128,953 A * 7/1992 Macken ........................ 372/58
5,147,694 A * 9/1992 Clarke ........................ 428/34
5,194,985 A 3/1993 Hilton, Sr.
5,776,612 A * 7/1998 Fisher ........................ 428/426
5,818,631 A 10/1998 Askinazi et al.
6,028,699 A * 2/2000 Fisher ........................ 359/360
6,038,065 A 3/2000 Borden

FOREIGN PATENT DOCUMENTS

EP 0529963 3/1993
FR 1537215 7/1967

OTHER PUBLICATIONS

D Harris: "Materials for Infrared Windows and Domes" (SPIE Optical Engineering Press 1948 pp195–214).
Kohin et al: "Design of transparent conductive coatings and filters" SPIE Crit. Rev. CR39: 3–34 (1992).
Pellicori and Colton "Fluoride compounds for IR Coatings" Thin Solid Films 209: 109–115 (1992).
Rudisill et al: "Optical Coatings for high energy Znse Laser Windows" Appl. Opt. 13 2075–2080 (1974).
Bui and Hassan "Highly durable conductive coating for visible and NIR applications" (Proc SPIE 3060: 2–10 (1997).

* cited by examiner

*Primary Examiner*—Edward J. Glick
*Assistant Examiner*—Hoon Song
(74) *Attorney, Agent, or Firm*—Mark M. Friedman

(57) ABSTRACT

An optical window assembly including an outer window, an inner window and a housing. The outer window and the inner window are mounted in the housing, holding the outer window and the inner window apart, forming an intervening space between the outer window and the inner window.

12 Claims, 4 Drawing Sheets

OPTICAL WINDOW ASSEMBLY FOR USE IN A SUPERSONIC PLATFORM

This application is Divisional of pending U.S. patent application Ser. No. 09/972,246 filed Oct. 9, 2001, which claims priority from Israel Patent Appl. No. 139304 filed on Oct. 26, 2000, pending.

FIELD AND BACKGROUND OF THE INVENTION

The present invention relates to an optical window or dome assembly configured for use high at high supersonic speeds and, more particularly, to an assembly which prevents excessive heating of heat sensitive components thereof, thereby preserving the optical properties thereof at high supersonic speeds. The invention further relates to a mobile platform equipped with such an assembly.

A typical guided missile is commonly made up of a number of sections, which are housed in, or connected to a generally cylindrical housing of varying radius in the longitudinal direction.

In one type of a guided missile, at the front of the missile is the guidance section which typically includes one or more sensors, such as a Forward Looking Infrared (FLIR) or video camera, and the various electronic systems which control the sensors, analyze and interpret the signals received by the sensors, and control the flight control system which positively determines the trajectory. The guidance section may also include means for receiving signals from outside of the missile and may also include means for transmitting signals from the missile.

Behind the guidance section of the missile is the warhead which is typically a hollow cylindrically shaped casing made of high strength steel. The function of the warhead is to place an explosive charge in the appropriate position at the moment of explosion, thereby maximizing the effect of the explosion on the target. Inside the hollow casing is placed the explosive and in the rear end of the warhead lies the ignition fuse which is designed to be set off at the proper moment, typically, at some pre-determined time after the warhead encounters the target. The warhead is typically made of three sections (i) a front section, or nose, which is usually in the shape of an ogive or cone; (ii) the main section which includes the explosive charge and is usually cylindrical; and (iii) the aft section which seals the explosive charge within the casing and holds the fuse.

Behind the warhead typically lies the engine which provides thrust to the missile.

Housed in and connected to the housing at the rear of the missile, and in some cases also in other locations along the missile housing, is the flight control section, including fins and foils, which are used to adjust and stabilize the trajectory of the missile during its flight to the target.

There is often a necessity for a missile or rocket to fly at high supersonic speeds. Such a necessity may arise for a number of reasons. For example, a missile fired at a moving airplane, whether from another airplane or from a fixed position on the ground, must travel at a speed greater than that of the target airplane. The distance between the launch point and the target airplane at the time of launch together with the speed of the target airplane will determine the speed at which the missile must travel. Since modem warplanes typically fly at speeds in excess of Mach 1, there is a need for missiles which fly at far greater speeds, for example Mach 4 or Mach 5. Additionally, missiles fired at stationary targets which are heavily defended by antimissile defense systems are most likely to reach the target if they fly at high supersonic speeds because this minimizes the time between detection and impact during which defensive measures may be taken.

Navigation of a guided missile to target must be conducted exclusively by a guidance system. One or more guidance systems are generally employed. Radar is one such guidance system. Radar is effective, but is subject to interference, both intentional interference deployed as defense mechanism, and accidental interference resulting from environmental conditions. Therefore, radar is often employed in conjunction with optical or electro-optical guidance systems, either of which may operate in the visible or infrared portion of the spectrum. These guidance systems are composed of a sensor or a detection system (e.g., electro-optical camera), and an analyzing system. The detection system must be onboard, although the analyzing system may be located outside the missile, for example at a base on the ground or in a platform such as an airplane which launched the missile, which communicates with the missile during flight. Alternatively, both the detection system and the analyzing system are carried on-board. This alternative, referred to as a "launch and forget" guidance system, is especially desirable in the case of missiles flying at high supersonic speeds where the time available for navigation decisions is extremely short, making communication with a remote location a practical impossibility.

The detection system must have a sensor in communication with the environment. At the same time, the sensor must be protected from the environment. For optical or electro-optical guidance systems this protection typically takes the form of an optical window or dome. These windows or domes are transparent to transmissions in a chosen range of wavelengths, while being opaque to transmissions with a wavelength outside that range. These optical windows or domes are typically coated with a shielding material which gives the window or dome the desired optical properties. As explained by D. Harris in "Materials for Infrared Windows and Domes (SPIE Optical Engineering Press, 1948), which is incorporated herein by reference, most common approaches to shielding include coating the optical window with an electrically conductive layer, covering the window with a metallic mesh, or increasing the conductivity of the material forming the window. In general, the thin electrically conductive coatings applied to the window are transparent at visible and/or infrared frequencies, but opaque to microwaves and radio waves. This makes such coatings useful in shielding sensitive electro-optical detectors against harmful electromagnetic interference (Kohin et al., SPIE Crit. Rev. CR39: 3–34(1992)). The shielding capabilities of these materials sterns from their ability to reflect and/or absorb incident radiation. In general, the greater the conductivity of the coating material, the more effective the shielding. Common coating materials are described in, for example, (i) Pellicori and Colton, Thin Solid Films 209: 109–115 (1992); (ii) Rudisill et al., Appl. Opt. 13: 2075–2080 (1974) and (iii) Bui and Hassan. Proc. SPIE 3060:2–10 (1997), all of which are incorporated herein by reference. Since the conductivity of these materials decreases with increasing temperature, they lose their shielding effectiveness when they are heated. At the same time, transmission of desired wavelengths through the shield is often diminished by heating.

Unfortunately, at high supersonic speeds (e.g., several mach), friction from the air causes heating of the optical window or dome, changing the conductivity of the coating and altering the optical properties thereof. This results in incapacitation of the detection system, either because transmissions in the chosen range of wavelengths no longer pass through the window or dome, or because interference (transmissions with a wavelength outside the chosen range) is allowed to pass through the window or dome.

There is thus a widely recognized need for, and it would be highly advantageous to have, an optical window or dome assembly which would be useable at high supersonic speeds without significant alterations in optical properties.

SUMMARY OF THE INVENTION

According to the present invention there is provided an optical window assembly including: (a) an outer window; (b) an inner window; and (c) a housing, wherein the outer window and the inner window are mounted, the housing holding the outer window and the inner window apart, thereby forming an intervening space between the outer window and the inner window.

According to the present invention there is provided An electro-optical detection system including: (a) an electro-optical payload; and (b) an optical window assembly, for passing, to the electro-optical payload, electromagnetic radiation in at least one wavelength band selected from the group consisting of visible wavelength bands and infrared wavelength bands, while blocking electromagnetic radiation of radio and radar frequencies, the optical window assembly including: (i) an outer window, (ii) an inner window, and (iii) a housing, wherein the outer window and the inner window are mounted, the housing holding the outer window and the inner window apart, thereby forming an intervening space between the outer window and the inner window.

According to the present invention there is provided a mobile platform including: (a) an electro-optical detection system including: (i) an optical window assembly, for admitting to the mobile platform electromagnetic radiation in at least one wavelength band selected from the group consisting of visible wavelength bands and infrared wavelength bands, while blocking electromagnetic radiation of radio and radar frequencies, the optical window assembly including: (A) an outer window, (B) an inner window, and (C) a housing, wherein the outer window and the inner window are mounted, the housing holding the outer window and the inner window apart, thereby forming an intervening space between the outer window and the inner window.

According to the present invention there is provided a method of detecting, from within a platform moving at a supersonic speed, electromagnetic radiation in at least one wavelength band selected from the group consisting of visible wavelength bands and infrared wavelength bands, including the steps of: (a) providing the platform with an inner window that is transparent in the at least one wavelength band; and (b) thermally insulating the inner window, from an atmosphere external to the platform, in a manner that allows the electromagnetic radiation to reach inner window.

The optical window assembly of the present invention includes two windows, an outer window and an inner window, held apart, and thereby defining an intervening space between the two windows, by being mounted in a housing. Some or all of the surfaces of the windows are coated with an electrically conductive optical coating that passes selected visible and/or infrared bands while blocking electromagnetic interference at radio and/or radar frequencies, or with a heat resistant anti-reflection coating. As used herein the term "electrically conductive" means having a surface resistivity of less than about 50 Ω square, preferably less than about 25 Ω square, and most preferably less than about 5 Ω square. As used herein, the term "heat resistant" means that during the supersonic flight of the platform, the optical transmission of the anti-reflective coating degrades by no more than about 25%. Preferably, the optical transmission of the anti-reflective coating degrades by no more than about 10%. Most preferably, the optical transmission of the anti-reflective coating does not degrade to any perceptible degree.

Preferably, the inner surface of the inner window, i.e., the surface of the inner window that faces away from the outer window, is coated with the optical coating, and the remaining surfaces are coated with the anti-reflection coating. Preferred materials of the optical coating include doped semiconductors such as doped gallium arsenide and doped germanium.

The primary insulation of the inner window from the heat of the external environment is provided by the intervening space between the two windows. This intervening space preferably is occupied either by vacuum or by a thermally insulating substance. Alternatively, a cooling fluid is circulated through the intervening space to actively cool the inner window.

The windows may be either curved or-planar, to conform with the shape of the platform wherein the window assembly is mounted.

An electro-optical payload of the present invention includes, in addition to the optical window assembly of the present invention, an electro-optical payload that includes an array of photosensitive elements and a focusing component for focusing, onto the array of photosensitive elements, visible and/or infrared light, in the selected bands, that enters the platform via the window assembly. The payload may also include a mechanism for circulating a cooling fluid through the intervening space of the window assembly.

In a mobile platform of the present invention, the electro-optical detection system is mounted with the outer surface of the outer window flush with the fuselage of the platform. The mobile platform also includes a mechanism for propelling the platform at supersonic speed.

The present invention also includes within its scope a method for detecting external visible and/or infrared radiation from within a moving platform, while that platform moves supersonically. The platform is provided with a window that admits the visible and/or infrared radiation while blocking electromagnetic interference at radio and/or radar frequencies. This window is thermally insulated from the external atmosphere in a manner that allows the desired visible and/or infrared radiation to reach the inner window. Preferably, this insulating is accomplished by making this window the inner window of the optical window assembly of the present invention.

The present invention successfully addresses the shortcomings of the presently known configurations by providing an optical window or dome assembly configured for use at high supersonic speeds and suited for use as part of an electro optical detection system, for example, an electro optical detection system serving as part of a guidance system of a missile or similar platform.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1A:
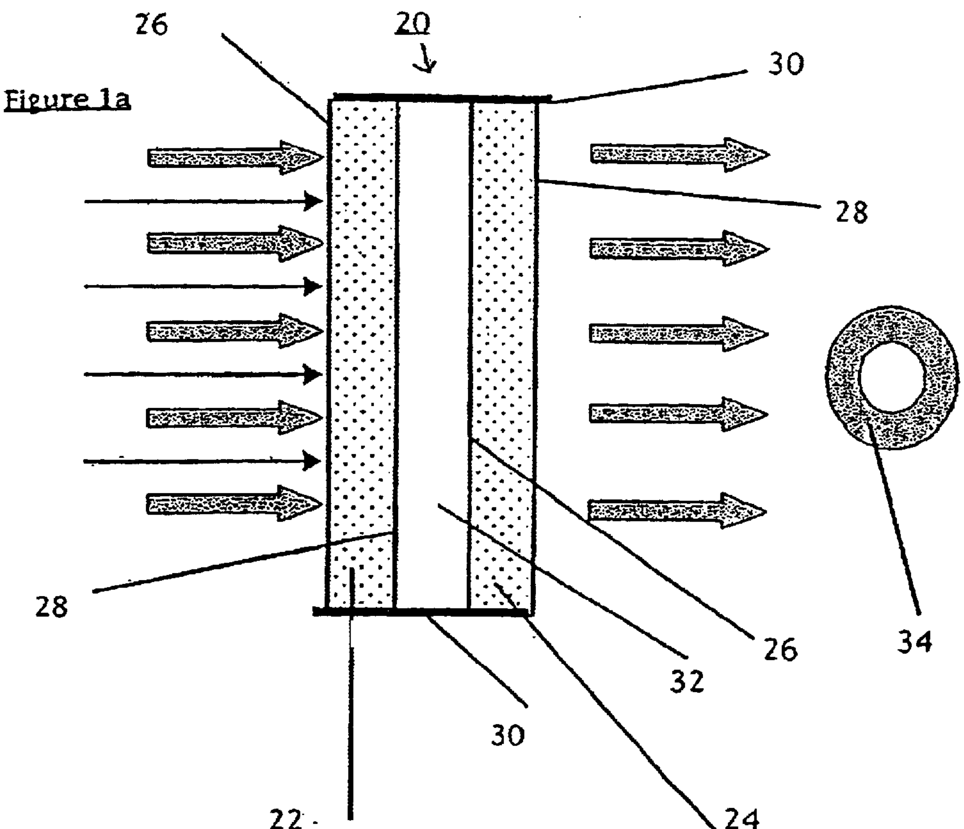
FIGS. 1A and 1B are cross sectional views of an optical window assembly and an optical dome assembly, respectively, of the present invention.

The present invention is of an optical window or dome assembly which can be used at high supersonic speeds. Specifically, the present invention can be used to prevent excessive heating of heat sensitive components of the assembly, thereby preserving the optical properties thereof at high supersonic speeds. The invention is further of a mobile platform, such as a guided missile, containing the assembly, of an electro-optical detection system containing the assembly, and of a method, of detecting electromagnetic radiation from within a platform moving at supersonic speed, that uses the assembly.

For purposes of this specification and the accompanying claims, the term "platform" refers to any manned or unmanned vehicle, or any portion thereof, that carries a payload that must receive visible or infrared radiation from its external environment. In the description below, the predominant example of such a platform is a missile. In the present context, "missile" refers to any launchable projectile, but not limited to a launchable projectile carrying an explosive charge. Included in the definition are both self-propelled missiles and those which move primarily due to an initial force applied at launch. This definition specifically includes "rockets" as a lay person commonly uses that term. Missiles referred to herein have as their primary, but not exclusive, purpose homing in on a target, contacting the target and damaging, or more preferably destroying, the target. To this end, missiles are typically equipped with a guidance system, as described hereinabove, and a navigation system capable of adjusting a flight trajectory of the missile so that it accurately impacts the target.

Nevertheless, the scope of the term "platform", as used herein, also includes other mobile vehicles, or portions thereof, that are required to receive visible or infrared radiation from their external environments. In particular, the scope of the term "platform", as used herein, includes an external pod attached to a manned aircraft, for example by being suspended from the wing of the manned aircraft. The scope of the term "platform", as used herein, also includes a drone that is tethered to and towed behind a manned or unmanned aircraft.

The principles and operation of a an optical window or dome assembly according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1B:
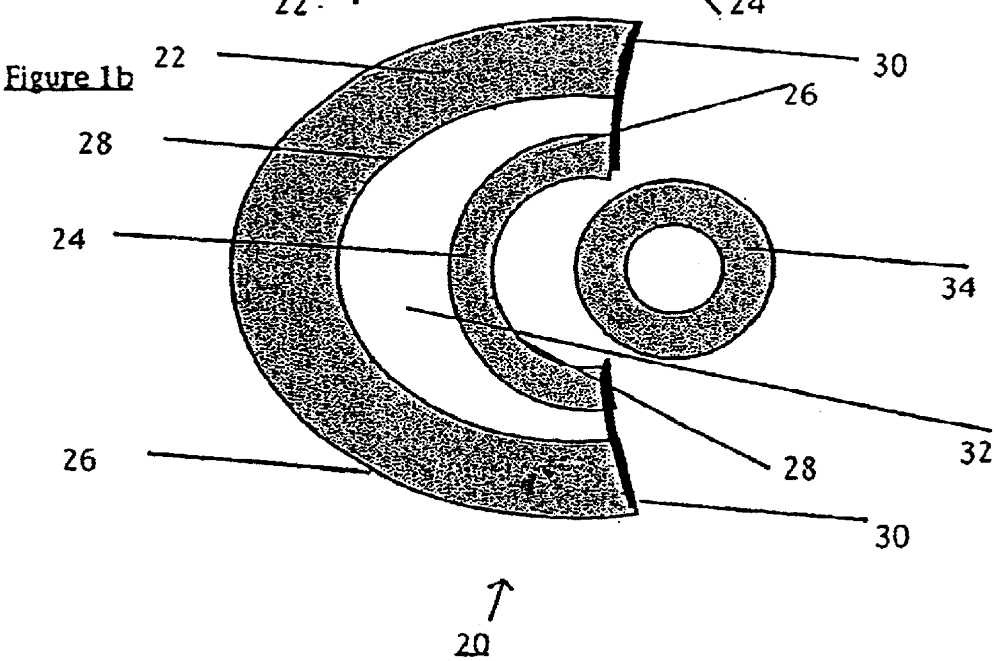
Figure 2:
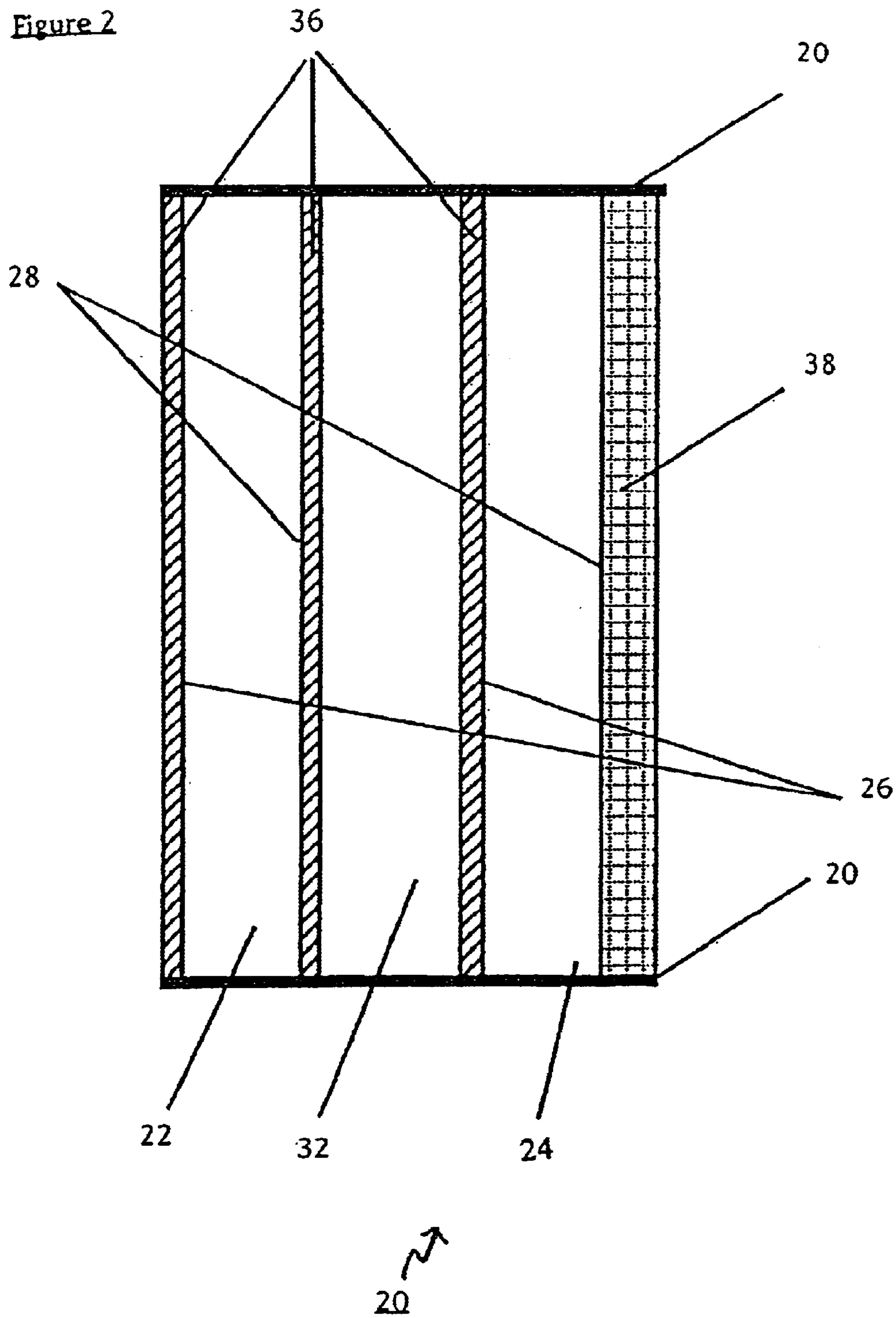
FIG. 2 is a detailed cross sectional view of the optical window assembly of FIG. 1A showing application of coatings to surfaces thereof.

FIGS. 1A and 1B and 2 show cross sectional views of an optical window or dome assembly 20 adapted for operation at high supersonic speeds in accordance with the teachings of the present invention. Assembly 20 includes a housing 30. Assembly 20 further includes an outer window or dome 22, an inner window or dome 24 an intervening space 32 formed between outer window or dome 22 and inner window or dome 24. Housing 30 holds inner window or dome 24 and outer window or dome 22 and helps define intervening space 32. Inner window or dome 24 and outer window or dome 22 each have an outer surface 26 and an inner surface 28. Outer surface 26 of outer window or dome 22 contacts an external atmosphere awhile assembly 20 travels at high supersonic speeds. Inner surface 28 of outer window or dome 22 outer surface 26 of inner window or dome 24 contact intervening space 32, such that they do not contact an external atmosphere. Outer surface 26 of inner window or dome 24 is therefore shielded from contact with the external atmosphere by outer window or dome 22 towards which it faces. Inner surface 28 of inner window or dome 24 faces away from the outer window or dome, contacting neither intervening space 32 nor the external atmosphere. This physical shielding protects inner dome or window 24 from excessive heating, for example heating caused by friction with the external atmosphere when traveling at high supersonic speeds.

In order to provide protection from excessive heating for inner dome or window 24, intervening space 32 is filled by a material characterized by high thermal insulation properties, for example, a gas at atmospheric pressure or a gas at sub-atmospheric pressure. The gas may, for example, be air. Alternatively, a cooling fluid is circulated through intervening space 32.

In order to increase the functionality of inner window or dome 24, it is coated with an optical coating 38 on its inner surface 28. Optical coating 38 is selected to be substantially transparent to radiation at the visible and/or the infrared portion of the electromagnetic spectrum and substantially opaque to radiation at the radio frequency and/or radar frequency portion of the electromagnetic spectrum.

For purposes of this specification and the accompanying claims, the term "excessive heating" is defined as the degree of heating which will interfere with function of an optical coating 38 (as set forth hereinbelow) for example by altering an electrical conductivity thereof or by changing the degree to which the coating absorbs or reflects transmissions of a specific wavelength.

For purposes of this specification and the accompanying claims, the term "conductivity" refers to electrical conductivity.

For purposes of this specification and the accompanying claims, the phrase "substantially transparent" is defined as permitting at least 75%, more preferably at least 85%, more preferably at least 95%, more preferably at least 99%, most preferably approximately 100% transmission of radiation of a specified wavelength.

For purposes of this specification and the accompanying claims, the phrase "visible portion of the electromagnetic spectrum" is defined as the portion of the electromagnetic spectrum with wavelengths between 0.4 microns and 0.8 microns. The most useful band within this portion of the electromagnetic spectrum is the band with wavelengths between 0.4 microns and 0.7 microns.

For purposes of this specification and the accompanying, claims, the phrase "infrared portion of the electromagnetic spectrum" is defined as the portion of the electromagnetic spectrum with wavelengths between 0.8 microns and 100 microns. Particularly useful bands within this portion of the electromagnetic spectrum include the band with wavelengths between 3 and 5 microns and the band with wavelengths between 8 and 14 microns.

For purposes of this specification and the accompanying claims, the phrase "substantially opaque" is defined as absorbing at least 75% of the incident radiation in a specified wavelength band.

For purposes of this specification and the accompanying claims, the term radio frequency" is defined as frequencies between 10 KHz and 300 GHz.

Optical coating 38 is typically characterized by high conductivity and may be, for example, a doped Gallium Arsenide coat or a doped Germanium coat.

Assembly 20 may employ additional, anti-reflective coating 36 applied over one or more, preferably all of the remaining surfaces of inner 24 and/or outer 22 windows or domes of assembly 20. Coating 36 functions to decrease the degree to which windows or domes 22 and/or 24 reflect or refract incident radiation, thereby increasing the amount of desired radiation which arrives at an electro-optical payload 34. Coating 36 is preferably selected heat resistant.

In some cases, assembly 20 includes inner window or dome 24 and outer window or dome 22 which are both planar windows as in FIG. 1A. In other cases assembly 20 includes inner window or dome 24 and outer window or dome 22 which are both domes, i.e., curved windows as in FIG. 1B.

Figure 3:
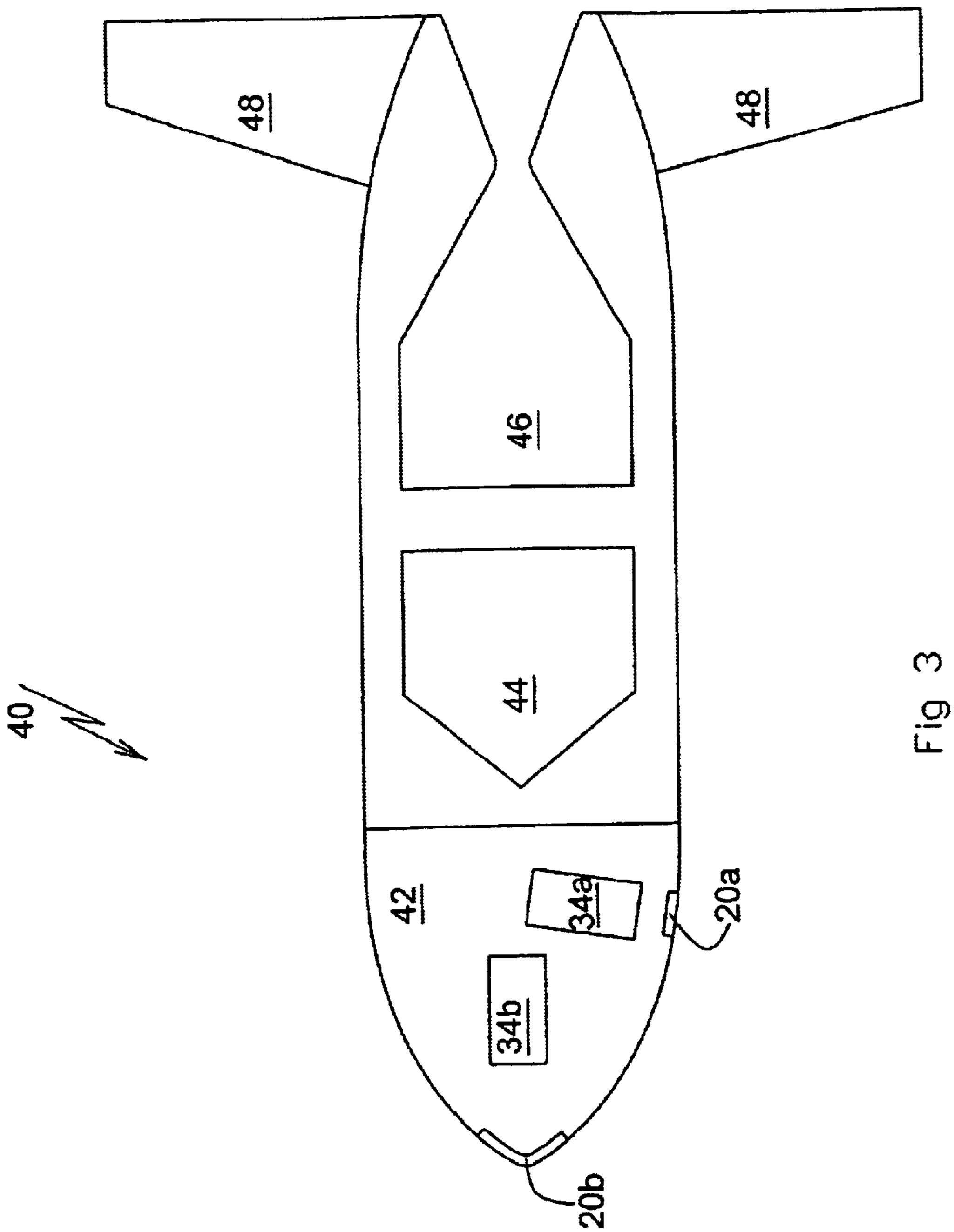
FIG. 3 is a schematic side view of a missile according to the present invention.

Assembly 20 is designed for use in a missile 40 (FIG. 3). Missile 40 is of the type discussed under "field and background", and includes a guidance section 42, a warhead 44, a propulsion system 46 and one or more flight control surfaces 48 (pictured as fins). Window assembly 20*a* or dome assembly 20*b* is typically installed in guidance section 42 of missile 40 rendering it ready for operation at high supersonic speeds. Assembly 20 serves as part of an electro-optical detection system of missile 40, the remainder of the electro-optical detection system being electro-optical payload 34. In the particular example illustrated, electro-optical payload 34*a* receives visible and infrared radiation from outside of missile 40 via window assembly 20*a* and electro-optical payload 34*b* receives visible and infrared radiation from outside of missile 40 via window assembly 20*b*.

Propulsion system 46 is an example of a mechanism for propelling an independently moving platform of the present invention, such as missile 40, at supersonic speed. In the case of a platform, such as a wing pod, that is attached or tethered to a mother vehicle, the mother vehicle propels the platform at supersonic speed.

The present invention is further embodied by a method of preventing excessive heating of optical coating 38, while operating at high supersonic speeds, where optical coating 38 is selected to be substantially transparent to radiation at the visible and/or the infrared portion of the electromagnetic spectrum and substantially opaque to radiation at the radio frequency and/or radar frequency portion of the electromagnetic spectrum. The method according to this aspect of the present invention is effected by: (a) providing assembly 20 which includes: (i) housing 30; (ii) outer window or dome 22 in contact with an external atmosphere and featuring outer surface 26 and inner surface 28, outer surface 26 of the outer window or dome 22 facing the external atmosphere, inner surface 28 of the outer window or dome 22 facing away from the external atmosphere; (iii) inner window or dome 24 being held by housing 30 and being shielded from contact with the external atmosphere by outer window or dome 22, inner window or dome 24 featuring outer surface 26 and inner surface 28, outer surface 26 of inner window or dome 24 facing outer window or dome 22, inner surface 28 of inner window or dome 24 facing away from outer window or dome 22; and (iv) intervening space 32 formed between outer window or dome 22 and inner window or dome 24; and (b) applying optical coating 38 on one of the outer surface 26 and the inner surface 28 of the inner window or dome 24, thereby preventing excessive heating of optical coating 38 while operating at the high supersonic speeds.

According to still another aspect of the present invention there is provided an electro-optical detection system comprising assembly 20 and an electro-optical payload.

When assembly 20, as part of an electro-optical detection system, is installed in missile 40 which is in use at high supersonic speed, incident radiation impacts outer surface 26 of outer window 22 (black arrows and stippled arrows; FIG. 1A). Interference radiation (black arrows) is blocked by optical coating 38, while visible and/or infrared radiation (stippled arrows) passes through optical coating 38 of inner window 24. This radiation impacts upon the electro-optical payload where it is used by the guidance system to make navigation decisions which allow missile 40 to home in on the target.

For purposes of this specification and the accompanying claims, the term "electro-optical payload" refers to an assembly which includes at least a focusing component and an array of photosensitive elements, e.g. a charge coupled device (CCD). The focusing component may include, for example, lenses, reflectors, beam splitters, mirrors, and prisms arranged or configured to direct and focus incident radiation to the array of photosensitive elements. The array of photosensitive elements absorbs incident radiation in the form of photons and generates an electrical output, the strength thereof corresponding to the number of photons absorbed. The CCD proportionally transforms the incoming photon signal to an electrical signal.

Figure 4:
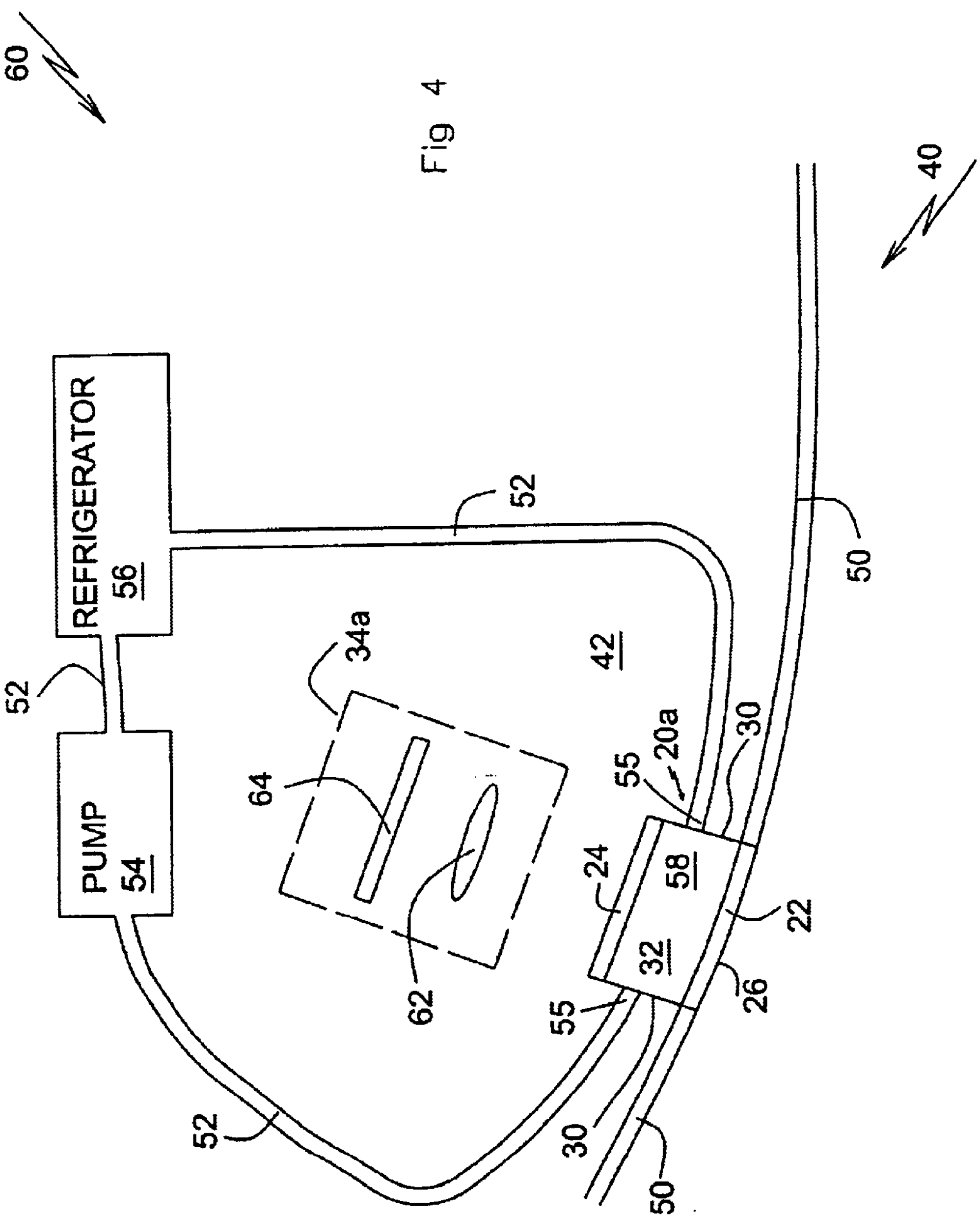
FIG. 4 is a schematic illustration of an electro-optical detection system mounted in the missile of FIG. 3.

FIG. 4 shows, schematically, an electro-optical detection system 60 of the present invention, including window assembly 20*a* and installed within guidance section 42 of missile 40. As noted above, electro-optical detection system 60 includes both window assembly 20*a* and electro-optical payload 34*a*. Electro-optical payload 34*a* includes a focusing component 62, represented symbolically as a convex lens and an array 64 of photosensitive elements. Visible and/or infrared radiation entering missile 40 via window assembly 20*a* is focused by focusing component 62 onto array 64. Note that outer surface 26 of outer window 22 of window assembly 20*a* is flush with fuselage 50 of missile 40. Electro-optical detection system 60 also includes a mechanism for circulating a fluid coolant 58 through intervening space 32 of window assembly 20*a*. Specifically, tubing 52 connects intervening space 32 of window assembly 20*a*, via ports 55 in housing 30 of window assembly 20*a*, to a refrigerator 56 and a pump 54. Pump 54 circulates coolant 58 through intervening space 32, and refrigerator 56 cools hot coolant 58 arriving from window assembly 20*a*.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications cited herein are incorporated by reference in their entirety. Citation or identification of any reference in this section or in any other section of this application shall not be construed as an admission that such reference is available as prior art to the present invention.

What is claimed is:

1. An electro-optical detection system comprising:

(a) an electro-optical payload; and (b) an optical window assembly, for passing, to said electro-optical payload, electromagnetic radiation in at least one wavelength band selected from the group consisting of visible wavelength bands and infrared wavelength bands, while blocking electromagnetic radiation of radio and radar frequencies, said optical window assembly including:

(i) an outer window, (ii) an inner window, and (iii) a housing, wherein said outer window and said inner window are mounted, said housing holding said outer window and said inner window apart, thereby forming an intervening space between said outer window and said inner window;

wherein said outer window includes an outer surface facing away from said inner window and an inner surface facing towards said inner window, wherein said inner window includes an outer surface facing towards said outer window and an inner surface facing away from said outer window, and wherein only said inner surface of said inner window is coated with an optical coating that is substantially transparent in at least one of said wavelength bands and that is substantially opaque to said electromagnetic radiation of radio and radar frequencies.

2. The electro-optical detection system of claim 1, wherein said intervening space is occupied by a vacuum.

3. The electro-optical detection system of claim 1, wherein said intervening space is occupied by a thermally insulating substance.

4. The electro-optical detection system of claim 1, wherein said intervening space is occupied by a coolant, the electro-optical detection system further a comprising:

(c) a mechanism for circulating said coolant through said intervening space.

5. The electro-optical detection system of claim 1, wherein said electro-optical payload includes:

(i) an array of photosensitive elements, and (ii) a focusing component for focusing said electromagnetic radiation in said at least one wavelength band onto said array.

6. A mobile platform comprising:

(a) an electro-optical detection system including:

(i) an optical window assembly, for admitting to the mobile platform electromagnetic radiation in at least one wavelength band selected from the group consisting of visible wavelength bands and infrared wavelength bands, while blocking electromagnetic radiation of radio and radar frequencies, said optical window assembly including:

(A) an outer window, (B) an inner window, and (C) a housing, wherein said outer window and said inner window are mounted, said housing holding said outer window and said inner window apart, thereby forming an intervening space between said outer window and said inner window;

wherein said outer window includes an outer-surface facing away from said inner window and an inner surface facing towards said inner window, wherein said inner window includes an outer surface facing towards said outer window and an inner surface facing away from said outer window, and wherein only said inner surface of said inner window is coated with an optical coating that is substantially transparent in at least one of said wavelength bands and that is substantially opaque to said electromagnetic radiation of radio and radar frequencies.

7. The mobile platform of claim 6, wherein said electro-optical detection system further includes:

(ii) an electro-optical payload for receiving said electromagnetic radiation in said at least one wavelength band.

8. The mobile platform of claim 6, further comprising:

(b) a fuselage; and wherein said outer window includes an outer surface that is substantially flush with said fuselage.

9. A method of detecting, from within a platform moving at a supersonic speed, electromagnetic radiation in at least one wavelength band selected from the group consisting of visible wavelength bands and infrared wavelength bands, comprising the steps of:

(a) providing the platform with an inner window that is transparent in the at least one wavelength band; and (b) thermally insulating said inner window, from an atmosphere external to the platform, in a manner that allows the electromagnetic radiation to reach said inner window, by steps including incorporating said inner window in an optical window assembly that also includes:

(i) an outer window between said external atmosphere and said inner window, and (ii) a housing, wherein said outer window and said inner window are mounted, said housing holding said outer window and said inner window apart, thereby forming an intervening space between said outer window and said inner window wherein said outer window includes an outer surface facing towards said external atmosphere and an inner surface facing towards said inner window, wherein said inner window includes an outer surface facing towards said outer window and an inner surface facing away from said outer window, and wherein only said inner surface of said inner window is coated with an optical coating that is substantially transparent in the at least one wavelength band and that is substantially opaque to said electromagnetic radiation of radio and radar frequencies.

10. The method of claim 9, wherein aid insulating is effected by steps further including providing a vacuum in said intervening space.

11. The method of claim 9, wherein said insulating is effected by steps further including providing a thermally insulating substance in said intervening space.

12. The method of claim 9, wherein said insulating is effected by steps further including circulating a coolant through said intervening space.

* * * * *

UNITED STATES PATENT AND TRADEMARK OFFICE

CERTIFICATE OF CORRECTION

PATENT NO. : 6,946,642 B2
APPLICATION NO. : 10/736508
DATED : September 20, 2005
INVENTOR(S) : Mangoubi et al.

It is certified that error appears in the above-identified patent and that said Letters Patent is hereby corrected as shown below:

Please insert the following claim as claim 13.

Col. 10, Line 59 insert

13. The mobile platform of claim 6, wherein said electro-optical payload includes:

(A) an array of photosensitive elements, and (B) a focusing component for focusing said electromagnetic radiation in said at least one wavelength band onto said array.

Signed and Sealed this

Twenty-second Day of August, 2006

JON W. DUDAS

*Director of the United States Patent and Trademark Office*

UNITED STATES PATENT AND TRADEMARK OFFICE

CERTIFICATE OF CORRECTION

PATENT NO. : 6,946,642 B2
APPLICATION NO. : 10/736508
DATED : September 20, 2005
INVENTOR(S) : Mangoubi et al.

It is certified that error appears in the above-identified patent and that said Letters Patent is hereby corrected as shown below:

Please insert the following claim as claim 13.

The mobile platform of claim 6, wherein said electro-optical payload includes:
(A) an array of photosensitive elements, and
(B) a focusing component for focusing said electromagnetic radiation in said at least one wavelength band onto said array.

Signed and Sealed this

Twenty-ninth Day of August, 2006

JON W. DUDAS
*Director of the United States Patent and Trademark Office*